(12) United States Patent
Mishra et al.

(10) Patent No.: US 8,498,592 B2
(45) Date of Patent: Jul. 30, 2013

(54) METHOD AND APPARATUS FOR IMPROVING ENERGY EFFICIENCY OF MOBILE DEVICES THROUGH ENERGY PROFILING BASED RATE ADAPTATION

(75) Inventors: Arunesh Mishra, Mountain View, CA (US); Suman Banerjee, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 410 days.

(21) Appl. No.: 12/555,379

(22) Filed: Sep. 8, 2009

(65) Prior Publication Data

US 2010/0098138 A1     Apr. 22, 2010

Related U.S. Application Data

(60) Provisional application No. 61/097,406, filed on Sep. 16, 2008, provisional application No. 61/095,216, filed on Sep. 8, 2008.

(51) Int. Cl.
*H01Q 11/12*     (2006.01)
*H04B 1/04*      (2006.01)
*H04B 7/00*      (2006.01)

(52) U.S. Cl.
USPC ............... 455/127.1; 455/127.5; 455/522; 370/318

(58) Field of Classification Search
USPC ............... 455/127.1–127.5, 522; 370/230, 370/318
See application file for complete search history.

(56) References Cited

U.S. PATENT DOCUMENTS

| | | | |
|---|---|---|---|
| 6,414,948 B1 * | 7/2002 | Sato | 370/335 |
| 6,526,031 B1 * | 2/2003 | Zaff et al. | 370/335 |
| 6,735,420 B2 * | 5/2004 | Baldwin | 455/127.2 |
| 6,819,938 B2 * | 11/2004 | Sahota | 455/522 |
| 6,898,438 B1 * | 5/2005 | Uchida | 455/522 |
| 6,909,704 B2 * | 6/2005 | Sakoda | 370/335 |
| 6,961,581 B2 * | 11/2005 | Goto et al. | 455/522 |
| 7,257,094 B2 * | 8/2007 | Shoemake | 370/311 |
| 7,289,771 B2 * | 10/2007 | Davis | 455/69 |
| 7,328,037 B2 * | 2/2008 | Tsien et al. | 455/522 |
| 7,330,902 B1 * | 2/2008 | Bergenwall et al. | 709/232 |
| 7,333,563 B2 * | 2/2008 | Chan et al. | 375/297 |
| 7,558,540 B2 * | 7/2009 | Jin et al. | 455/127.2 |
| 7,561,858 B2 * | 7/2009 | Nagano | 455/127.1 |
| 7,583,625 B2 * | 9/2009 | Bennett | 370/313 |
| 7,610,495 B2 * | 10/2009 | Azadet et al. | 713/300 |
| 7,653,408 B1 * | 1/2010 | Kopikare et al. | 455/522 |
| 7,813,695 B2 * | 10/2010 | Haartsen | 455/11.1 |
| 7,894,844 B2 * | 2/2011 | Hiddink et al. | 455/522 |

(Continued)

OTHER PUBLICATIONS

Robust Header Compression (ROHC), Wikipedia, http://en/wikipedia.org/wiki/Robust_Header_Compression, Feb. 2, 2010. USA.

Pering, Trevor, et al., Coolspots: Reducing the Power Consumption of Wireless Mobile Devices with Multiple Radio Interfaces, MobiSys '06, Jun. 19-22, 2006, pp. 220-232, Uppsala, Sweden, ACM, New York, NY USA.

Banerjee, Soman, et al., Minimum Energy Paths for Reliable Communication in Multi-hop Wireless Networks, MOBIHOC '02, Jun. 9-11, 2002, pp. 145-156, EPFL, Lausanne, Switzerland, ACM, New York, New York, USA.

*Primary Examiner* — Simon Nguyen
(74) *Attorney, Agent, or Firm* — Boyle Fredrickson S.C.

(57) ABSTRACT

Improved battery life for mobile wireless devices communicating using standard network protocols is obtained by measuring an energy profile of the transmitter circuitry with respect to transmission rate and transmission energy and adjusting operating conditions according to measured or deduced error rates. Additional energy savings are obtained reducing the total number of bits transmitted using payload compression and header truncation making use of application layer communications between the remote device and a power-unconstrained proxy device.

20 Claims, 3 Drawing Sheets

U.S. PATENT DOCUMENTS

| | | | |
|---|---|---|---|
| 8,041,375 B2 * | 10/2011 | Laroia et al. | 455/517 |
| 2002/0147025 A1 * | 10/2002 | Savas | 455/522 |
| 2004/0114555 A1 * | 6/2004 | Hayashi et al. | 370/329 |
| 2005/0143115 A1 * | 6/2005 | Hiddink et al. | 455/522 |
| 2005/0272456 A1 * | 12/2005 | Yoshii et al. | 455/522 |
| 2006/0252367 A1 * | 11/2006 | Haartsen | 455/11.1 |
| 2007/0049239 A1 * | 3/2007 | Joung et al. | 455/343.1 |
| 2007/0165526 A1 * | 7/2007 | Lee | 370/230 |
| 2009/0081971 A1 * | 3/2009 | Rofougaran | 455/127.1 |

* cited by examiner

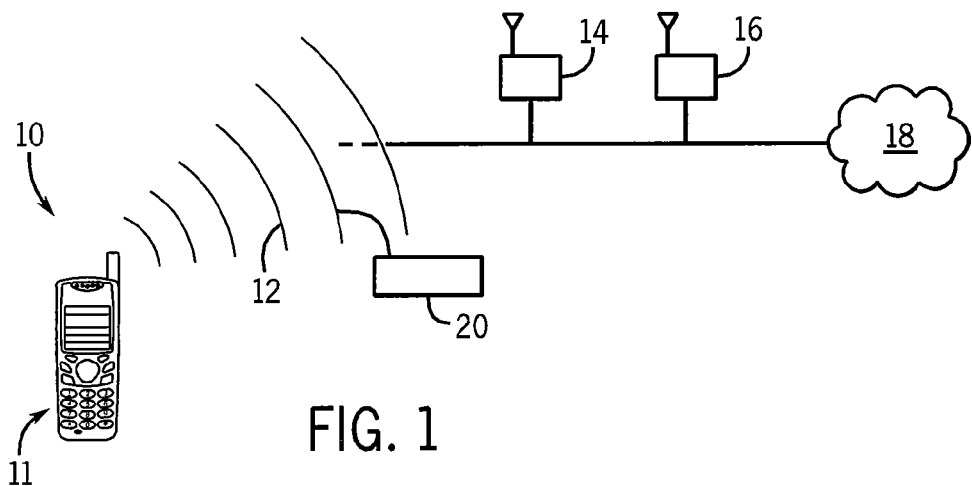
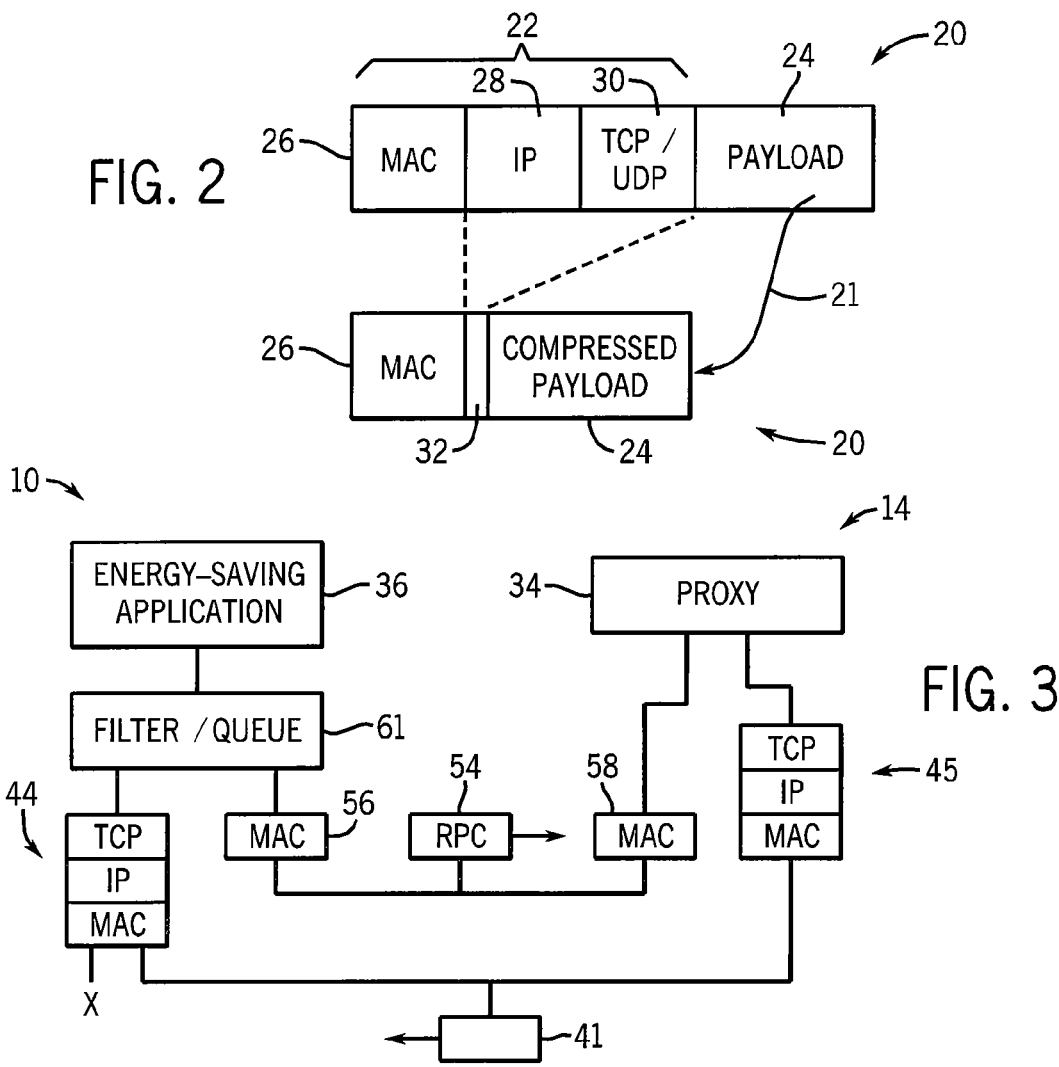

METHOD AND APPARATUS FOR IMPROVING ENERGY EFFICIENCY OF MOBILE DEVICES THROUGH ENERGY PROFILING BASED RATE ADAPTATION

CROSS-REFERENCE TO RELATED APPLICATIONS

This application claims the benefit of U.S. provisional applications 61/097,406 filed Sep. 16, 2008 and 61/095,216 filed Sep. 8, 2008, both hereby incorporated by reference.

STATEMENT REGARDING FEDERALLY SPONSORED RESEARCH OR DEVELOPMENT

This invention was made with United States government support awarded by the following agency:
NSF 0520152
The United States government has certain rights in this invention.

BACKGROUND OF THE INVENTION

The present invention relates to wireless devices and, in particular, to a method and apparatus for reducing power consumption of mobile devices when connecting to the Internet or the like.

Mobile devices are increasingly called on to connect to computer networks such as the Internet, for example, using the IEEE 802.11 protocol. Such network connections permit Web browsing, e-mail communication, and voice-over-IP (VoIP) telephony, as well as other similar Internet services. Unfortunately, standard wireless network protocols are relatively energy-inefficient and thus use of such wireless connections significantly reduces the operating time of the device on a single battery charge. For example, some current state-of-the-art cellular phones without IEEE 802.11 interfaces provide a talk-time of seven to eight hours, while the corresponding device using the IEEE 802.11 interface for VoIP may have a talk time of only two to three hours.

What is needed is a method of improving the energy efficiency of wireless network communications that is broadly applied to current networks and protocols.

SUMMARY OF INVENTION

The present invention increases the energy efficiency of network communications by determining an "energy profile" of the transmitting device that models energy consumption at different transmission rates and powers. The energy profile is used to dynamically adjust the transmission rate and power as the transmission environment changes as reflected by different transmission error rates. This profiling technique may be supplemented by a modified communication protocol that reduces the amount of data that must be transmitted by using data compression and/or a remote proxy device that largely handles network protocol data unrelated to the transmission of payload data in place of the mobile device.

Specifically, the present invention provides a digital radio transmitter having a transmitter circuit receiving, for transmission, digital data having data elements. The transmitter circuit also receives control signals controlling transmission power and transmission rate of the transmission. An electronic memory stores data providing an energy profile function relating a plurality of transmission power points and transmission rate points to energy consumption of the digital radio transmitter, and an energy management unit reads the energy profile function to generate the control signals for transmission power and transmission rate to the transmitter circuit to reduce energy consumption per data element during transmission.

It is thus an aspect of at least one embodiment of the invention to permit sophisticated control of transmission rate and power levels in mobile devices based on the energy consumption characteristics of a particular device in order to reduce the energy consumed by a given message.

The digital radio transmitter may further include a transmission error detection circuit providing a signal indicating error rate in the transmission by the digital radio transmitter, and the energy management unit may dynamically generate the control signals for transmission power and transmission rate to the transmitter circuit to reduce energy consumption per data element during transmission in response to changing error rate.

It is thus an aspect of at least one embodiment of the invention to respond to changing error rates to adjust transmission power for improved energy efficiency in different and dynamic transmission environments.

The energy management unit may operate to reduce a total energy consumption of a data transmission comprised of the sum of originally transmitted digital data and retransmission of at least a portion of the originally transmitted digital data required because of transmission errors.

It is thus a feature of at least one embodiment of the invention to consider energy consumption not only in originally transmitted data but also in the retransmissions caused by errors that may change as a function of power levels and transmission rates.

The energy management unit may operate to minimize the equation:

$$\frac{E(p_i, r_j)}{1-q}$$

where $E(p_i, r_j)$ is the energy consumption as a function of transmission power $p_i$ and transmission rate $r_j$ per the energy profile function and q is the error rate.

It is thus an aspect of at least one embodiment of the invention to permit a variety of minimization functions to optimize energy usage.

The energy profile function may model an energy per transmitted bit substantially as being inversely proportional to data rate.

It is thus an object of the invention to provide a simple approximation of energy usage as a function of rate eliminating the need for extensive data storage required by a table.

The energy profile function may provide an energy per transmitted bit decreasingly increasing as a function of transmission power.

It is thus an object of the invention to optimize energy usage for devices whose actual energy profiles differ from a simple model of such devices.

The digital radio transmitter may further include a network protocol circuit receiving the payload data and providing the digital data for transmission to the transmitter circuit, the network protocol circuit selectively compressing the payload data to reduce energy consumption.

It is thus an aspect of at least one embodiment of the invention to reduce energy consumption by reducing the number of transmitted bits.

The network protocol circuit may add header data to the payload data to create the digital data for transmission and may select between full header information and reduced header information to reduce energy consumption.

It is thus an object of the invention to reduce header data to reduce the number of transmitted bits without affecting the payload data.

The network protocol circuit may communicate with a second digital radio transmitter that is substantially unconstrained by energy usage to provide a proxy at the second digital radio transmitter for a network protocol implemented by the network protocol circuit, the proxy holding network protocol state information for the digital radio transmitter reducing the transmissions required by the digital radio transmitter using the proxy when compared to the digital radio transmitter directly implementing the network protocol.

It is thus an aspect of at least one embodiment of the invention to transfer network protocol tasks from the mobile device to a device having better access to electrical power thereby eliminating the need for some protocol transmissions from the mobile device.

The digital radio transmitter may communicate with the proxy by remote procedure calls at the application level.

It is thus an aspect of at least one embodiment of the invention to provide a simple method of reducing protocol level communications by breaking the communication stack at the application level.

These particular features and advantages may apply to only some embodiments falling within the claims and thus do not define the scope of the invention.

BRIEF DESCRIPTION OF THE FIGURES

FIG. 1 is a simplified diagram of a mobile device communicating with a stationary access point that may also serve as a network proxy;

FIG. 2 is a diagram of a data packet exchanged between the mobile device and the stationary access point of FIG. 1 showing compression of the payload and the elimination of Internet layer and transport layer headers;

FIG. 3 shows a data communication diagram of data flow between the wireless and stationary access devices of FIG. 1 in which remote procedure calls are used to eliminate the need to transmit Internet and transport layer header data;

DETAILED DESCRIPTION OF THE PREFERRED EMBODIMENT

Figure 4:
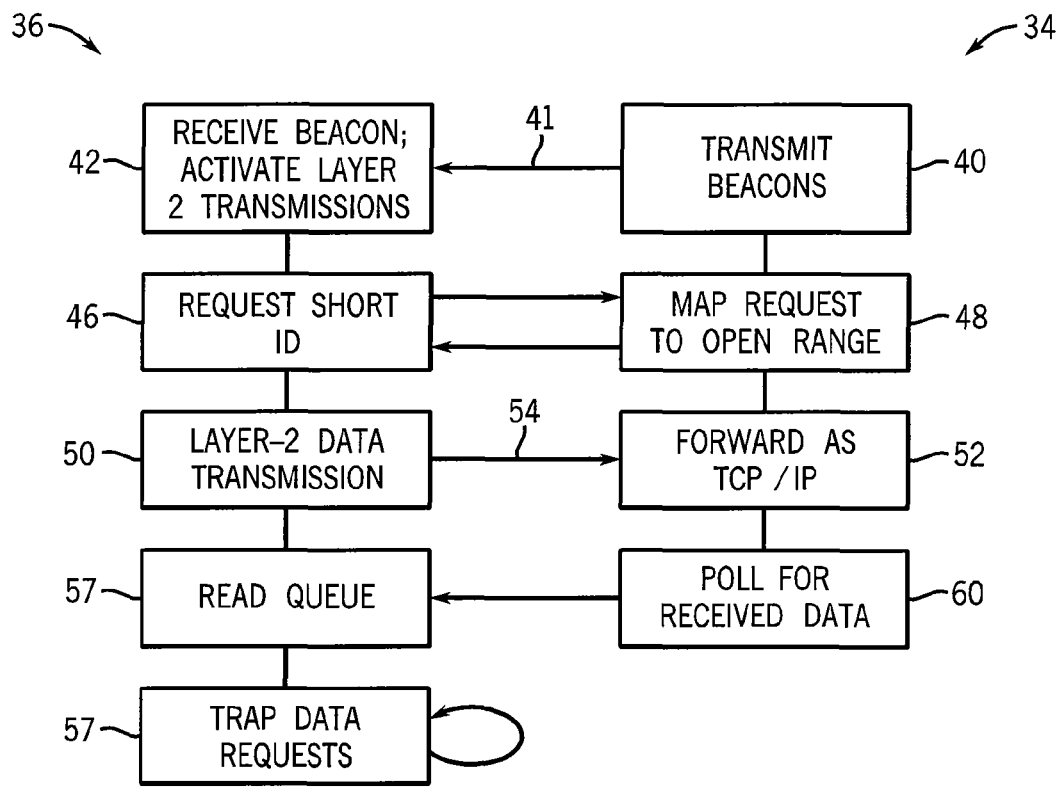
FIG. 4 is a flow chart describing the steps of communication in the data communication of FIG. 3.

Referring now to FIG. 1, a mobile device 10, for example a mobile computer, phone, camera or the like, may provide for a self-contained and limited power source such as a battery 11 and may communicate wirelessly by radio signals 12 with an access point 14 generally being stationary and having a unconstrained source of power such as line power or the like. The access point 14 may communicate with other devices 16 and, more generally, with the Internet 18 to provide communication between the mobile device 10 and the Internet 18. The wireless communication may be implemented using the IEEE 802.11 standard or other similar standards providing for packet transmissions of data according to a network protocol such as TCP/IP to communicate data as discrete packets 20.

Referring now to FIG. 2, the packets 20 communicated using the radio signals 12 may follow a conventional TCP/IP protocol and have a header section 22 and a payload section 24, the latter containing the data to be communicated. As is understood in the art, header section 22 provides addressing information to transmit the packet 20 to a destination device and assemble it with other correlated packets under the network protocol. In the TCP/IP protocol, header section 22 will include a MAC address 26, an IP address 28, and a TCP/UDP address 30. Generally, as will be described in more detail below, the present invention replaces the IP and TCP/UDP header portions of the IP address 28 and TCP/UDP address 30 with a proxy address 32. In the case of the TCP/IP protocol, the IF address 28 and TCP/UDP address 30 may be approximately 40 bytes in length and the proxy address 32 may be as little as a single byte in length. By eliminating the IP address 28 and TCP/UDP address 30, a considerable saving in transmission power is realized.

The payload section 24 may also be compressed as indicated by arrow 21 to produce a compressed payload section 20' using compression techniques as are generally understood in the art.

The eliminated IP address 28 and TCP/UDP address 30 are necessary for conventional TCP/IP communication with the Internet 18 and accordingly, referring to FIG. 3, the present invention employs a proxy application 34 at the access point 14 that will receive payload data from a corresponding mobile application 36 at the wireless device 10 and reconstruct the necessary IP address 28 and TCP/UDP address 30 as will be described.

Referring to FIGS. 3 and 4, the proxy application 34 will routinely transmit beacon signals 41 as indicated by process block 40 indicating that it can operate in the energy saving mode of the present invention. These beacon signals 41 may be transmitted from the proxy application 34 through a stack 45 providing for TCP/IP/MAC protocol layers. Conversely, the beacon signals 41 may be received by the mobile application 36 as indicated by process block 42 through a similar stack 44 according to conventional techniques known in the art.

Receipt of these beacon signals at process block 42 activates a "layer-two" transmission protocol between the mobile application 36 and the proxy application 34. This layer two transmission is initiated as indicated by process block 46 by the mobile application 36 requesting a short (one byte) ID of the proxy application 34 which maps, as indicated by process box 48, the request to any open address within the one byte range. The size of this short ID is constrained by recycling ID numbers as necessary. The short ID becomes the proxy address 32 described above with respect to FIG. 2.

At process blocks 50 and 52, layer two communication is performed by means of remote procedure calls 54 permitting the mobile application 36 to communicate with the proxy application 34 through a reduced-size stack 56 providing only for the transmission of a MAC address 26. This transmission is decoded using reduced-size stack 58 at the access point 14. Socket calls such as Send( ) may thus be transmitted directly from the mobile application 36 to the proxy application 34 without the IP address 28 and TCP/UDP address 30 resulting in substantial power savings in reduced transmitter power.

Return information may be processed as indicated by process blocks 57 and 60 by the mechanism of having the proxy application 34 periodically poll its sockets for data that has been received by the proxy application 34 from the Internet 18 or the like and intended for the device 10. Identified data is then transmitted by remote procedure calls to the proxy application 34 which stores the received data in the queue/filter 61. The queue/filter 61 is then read by the mobile application 36 locally when a Receiver( ) socket call is made.

Ideally, only data payload communicating socket calls are communicated by remote procedure calls 54 between the mobile application 36 and the proxy application 34. Other socket calls may be trapped by the intervening queue/filter 61 and handled locally or directed to the stack 44 per process block 57. Thus, for example, socket calls such as Send( ) will be passed to the reduced-size stack 56 such as represent most of the socket calls in a communication stream. Socket calls such as Getsockopt( ) and Setsockopt( ) which constitute a small proportion of the total socket calls, may be sent by the stack 44. Calls such as Recv( ), Getsockname( ), Getsockopt( ), and Setsockopt( ) which only modify a local state may be handled without transmission to the proxy application 34.

It will be understood that the proxy application 34 holds the state variables for the communication of data by the proxy application 34 using TCP/IP protocol and thus may handle these communications directly with the Internet 18 without relaying data to the mobile application 36 to obtain such state information.

As described, the present invention may significantly reduce the amount of data that needs to be transmitted between the mobile device 10 and the stationary access point 14 thus reducing drain on the power resources of the remote device 10 which, to a first order, will be dependent of how many bits are transmitted. The present invention may also reduce the energy necessary to transmit the bits by the remote device 10 by carefully characterizing the energy efficiency of the remote device 10 at a variety of transmission rates and transmitter powers and using the resultant energy profile to dynamically control transmission rate and transmission power to improve transmission efficiency.

Figure 5:
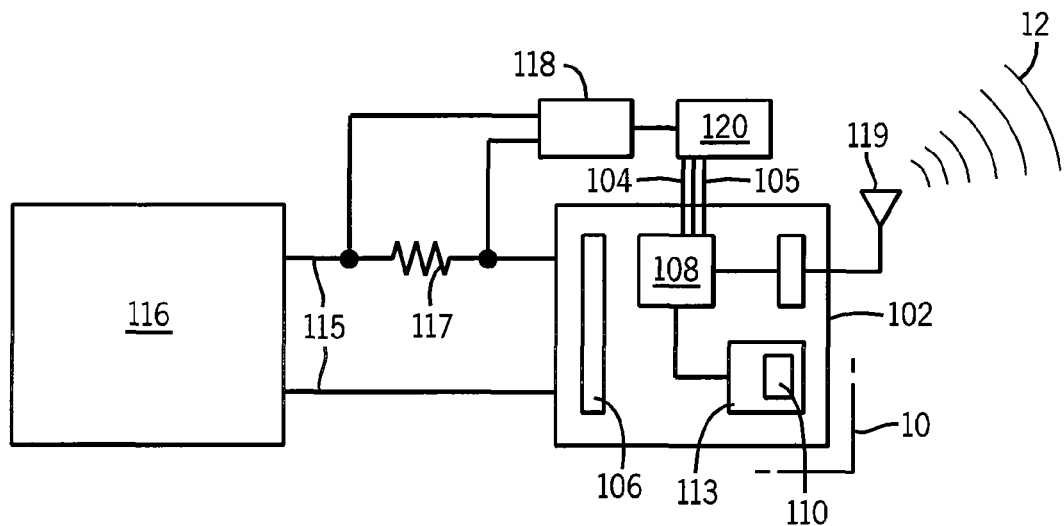
FIG. 5 is a simplified block diagram of the test circuit used to determine an energy profile of the mobile device.
Figure 8:
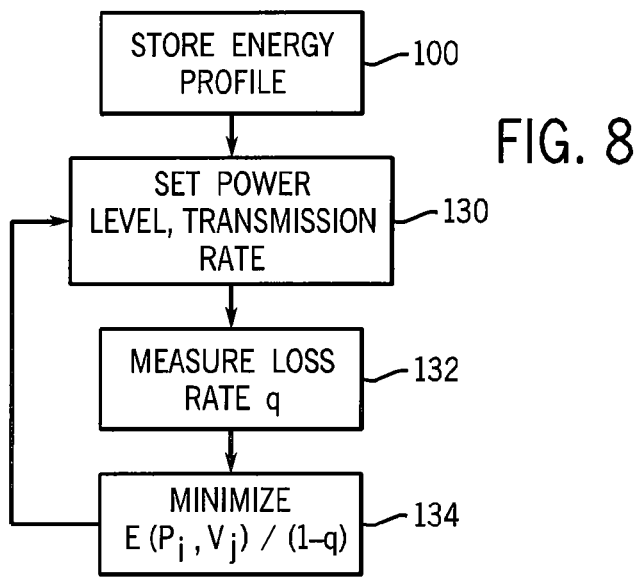
FIG. 8 is a flow chart showing the steps of generating the energy profile and using it per FIG. 7 to reduce energy consumption.

Referring now to FIGS. 5 and 8, a first step of this technique, as indicated by process block 100, develops an energy profile characterizing the consumed energy per transmission bit (or other convenient increment) as a function of various operating conditions of the transmission circuits. Generally the remote device 10 will include a transceiver 102 for transmitting and receiving digital data according to a network standard, the digital data received over a data line 103 from other portions of the mobile device 10 and representing voice, text or the like. The transceiver 102 may include, for example, power conditioning circuits 106 receiving power from a battery power supply 116 to power the circuitry of the transceiver 102, a processor 108 executing a stored program 110 held in memory 113 for implementing the communication protocol of the present invention, and a radiofrequency circuit 114 communicating with an antenna 119 for transmitting and receiving the radio signals 12.

Figure 6:
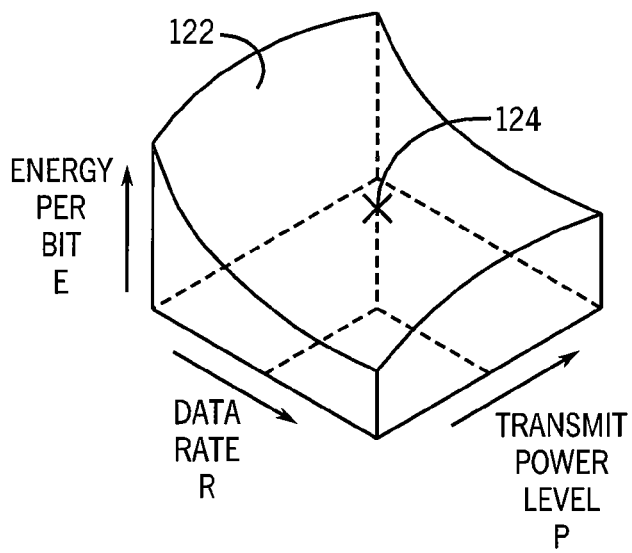
FIG. 6 is a simplified representation of the surface representing one possible energy profile.

Power supply lines 115 between a power supply 116 and the power conditioning circuit 106 may be instrumented by the addition of a small current measuring resistor 117 whose voltage drop may be captured by an analog-to-digital converter 118 communicating with a desktop computer 120 or the like acting as a data logger. The desktop computer 120 may output simulated packet data over data line 103 to the transceiver 102, for example random data representing typical network traffic data, and may further provide control signals 104 controlling the data rate of transmission of the radiofrequency circuit 114 and the power level at which the radiofrequency circuit 114 will transmit. Energy use per bit may therefore be monitored for each transmission rate and transmitter power to produce an energy profile 122 shown generally in FIG. 6.

Typically the energy profile 122 will show decreased energy use per bit as the data rate increases reflecting the shorter transmission times per bit at high data rates. This relationship, however, is decreasingly decreasing reflecting the increasing significance of steady-state energy costs for the transceiver 102 as well as inefficiencies such as switching losses that increase at high data rates.

Generally too, the amount of energy per bit will increase as the transmit power level is increased; however, the present inventors have determined that there is a significant diminishing effect of increased transmitter power on increased energy per bit in many commercially available transmitter cards. For example, in at least one such device, when transmit power was increased from 10 mW to 63 mW (a factor of 6.3 increase), the energy use per bit increased only from 16 nJ to 84 nJ, an increase of only about 40%. The energy profile 122 thus provides, for any given data rate and any given transmit power rate, an energy per bit value 124.

Figure 7:
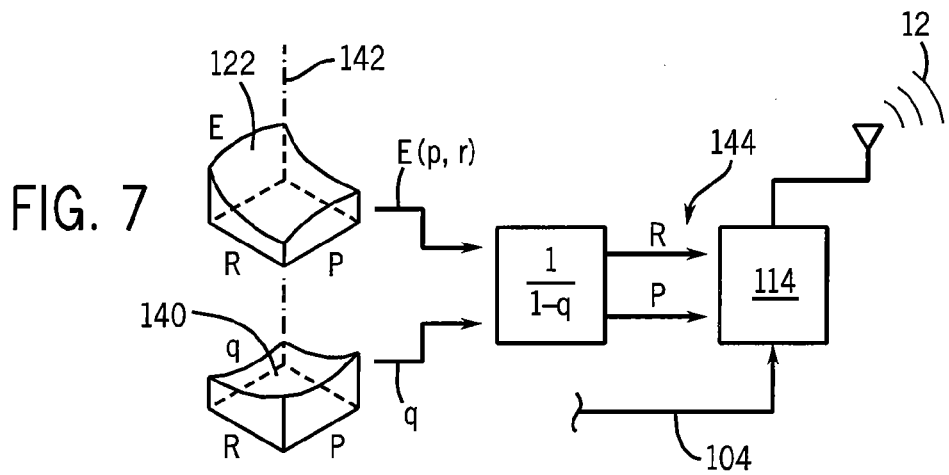
FIG. 7 is a block diagram showing use of the energy profile of FIG. 6 in controlling data rate and power levels of a transmitter circuit.

Referring now to FIGS. 7 and 8, the surface described by the energy profile 122 may be discretized for storage per process block 100 and arbitrarily interpolated as is understood in the art during use of the transceiver 102. As indicated by process block 130, during transmission by the mobile device 10, the power level and transmission rate will be set initially to a predetermined default value. As indicated by process block 132, initial transmissions using these settings may be monitored using conventional error detection techniques to determine a data loss rates q. This determination of data loss rates, for example, may use error detection techniques provided by conventional error correction codes to detect errors and may monitor resultant retransmission of packets under the communication protocols.

At process block 134, the energy profile 122 is consulted with respect to the measurement of the error loss rates q to minimize the total energy expended going forward, not only the transmission of the data originally but any necessary retransmissions. This minimization may operate on the following function:

$$\frac{E(p_i, r_j)}{1-q}$$

where $E(p_i, r_j)$ is the energy consumption as a function of transmission power $p_i$ and transmission rate $r_j$ per the energy profile function and q is the error rate. Based on this minimization process, a new power level and transmission rate may be selected to be used per process block 130 and this process repeated on a dynamic basis.

Referring now to FIG. 7, in effect, this energy minimization process combines an unknown error rate function providing error rate q as a function of power and transmission rate for a particular transmission environment (producing an error rate surface 140) with the known energy profile 122. The invention may make slight real-time perturbations to the transmission power and transmission rate to locally observe the error rate surface 140 or a portion of the surface around the current operating state and to make changes in transmission rate and transmitter power necessary to reduce energy consumption. Thus, for each operating state of a transmission rate (R) and a power level (P) an energy usage rate E(p, r) will be obtained and an error rate q(p, r) will be obtained. The energy usage may be multiplied by 1/1−q (the burden imposed by necessary retransmissions) to obtain effective energy usage per bit at a given operating state 142. Nearby operating states may then be examined by slight perturbations in operating conditions to determine whether the operating state of transmission rate and transmission power should be changed and, if so, whether those new operating states 144 provided to the radiofrequency circuit 114 through control signals 104 optimize the transmission of the radio signals 12.

It should be understood that even for a fixed energy profile 122 changes in the surface 140 will cause constant readjustments of the ideal operating state of the radiofrequency circuit 114 and, further, that generally the desired operating state for reduced energy usage will not be equal to the desired operating state for maximum data transmission.

It will be appreciated that any of the techniques for improved energy savings described herein may be used individually or in combination and that they may be implemented through software, firmware, or the like and are not limited to a particular communication protocol.

The present invention contemplates a mobile device 10 that may operate in an energy saving mode as will be described or that may switch between the energy saving mode and a standard mode optimized for maximum transmission speed or the like. This latter mode may use standard transmission techniques and/or portions of the data reduction techniques described above without the adjustments to transmission rate and power according to the energy profiling.

It is specifically intended that the present invention not be limited to the embodiments and illustrations contained herein, but include modified forms of those embodiments including portions of the embodiments and combinations of elements of different embodiments as come within the scope of the following claims.

We claim:

1. A digital radio transmitter comprising:
    a transmitter circuit receiving for transmission digital data having data elements, the transmitter circuit also receiving control signals controlling transmission power and transmission rate of the transmission;
    an electronic memory storing data providing an energy profile function relating a plurality of transmission power and transmission rate values to energy consumption values of the digital radio transmitter, the energy consumption values of the energy profile capturing energy inefficiencies of actual hardware of the digital radio transmitter and providing at least one of:
    (i) a relationship reflecting energy use per bit as a function of transmission rate where energy use per bit decreases less than in inverse proportion to increase in transmission rate; and
    (ii) a relationship reflecting energy use per bit as a function of transmission power where energy use per bit increases less than in proportion to increase in transmission power; and
    an energy management unit communicating with the transmitter circuit and electronic memory and operating in at least one mode to read the energy profile function to generate the control signals for transmission power and transmission rate to the transmitter circuit to reduce energy consumption per data element during transmission
    further including a transmission error detection circuit providing a signal indicating error rate in the transmission by the digital radio transmitter; and
    wherein the energy management unit also receives the signal indicating error rate and reads the energy profile function to dynamically generate the control signals for transmission power and transmission rate to the transmitter circuit to reduce energy consumption per data element during transmission in response to changing error rate.

2. The digital radio transmitter of claim 1 wherein the energy management unit reduces a total energy consumption of a data transmission comprised of the sum of originally transmitted digital data and retransmission of at least a portion of the originally transmitted digital data required because of transmission errors indicated by the error rate.

3. The digital radio transmitter of claim 1 wherein the energy profile function models an energy per transmitted bit as being substantially inversely proportional to data rate.

4. The digital radio transmitter of claim 1 wherein the energy profile function provides an energy per transmitted bit substantially proportional to transmission power.

5. The digital radio transmitter of claim 1 wherein the digital radio transmitter further includes a network protocol circuit receiving payload data and providing the digital data for transmission to the transmitter circuit, the network protocol circuit selectively compressing the payload data to reduce energy consumption.

6. The digital radio transmitter of claim 5 wherein the network protocol circuit adds header data to the payload data to create the digital data for transmission and where the network protocol circuit selects between full header information and reduced header information to reduce energy consumption.

7. The digital radio transmitter of claim 6 wherein the network protocol circuit communicates with a second digital radio transmitter that is substantially unconstrained by energy usage to provide a proxy at the second digital radio transmitter for a network protocol implemented by the network protocol circuit, the proxy holding network protocol state information for the digital radio transmitter reducing transmissions required by the digital radio transmitter using the proxy when compared to the digital radio transmitter directly implementing the network protocol.

8. The digital radio transmitter of claim 7 wherein the network protocols circuit executes a TCP/IP network protocol and wherein the IP and TCP headers are removed.

9. The digital radio transmitter of claim 8 wherein the digital radio transmitter communicates with the proxy by remote procedure calls at an application level.

10. A digital radio transmitter comprising:
    a transmitter circuit receiving for transmission digital data having data elements, the transmitter circuit also receiving control signals controlling transmission power and transmission rate of the transmission;
    an electronic memory storing data providing an energy profile function relating a plurality of transmission power and transmission rate values to energy consumption values of the digital radio transmitter, the energy consumption values of the energy profile capturing energy inefficiencies of actual hardware of the digital radio transmitter and providing at least one of:
    (i) a relationship reflecting energy use per bit as a function of transmission rate where energy use per bit decreases less than in inverse proportion to increase in transmission rate; and
    (ii) a relationship reflecting energy use per bit as a function of transmission power where energy use per bit increases less than in proportion to increase in transmission power; and
    an energy management unit communicating with the transmitter circuit and electronic memory and operating in at least one mode to read the energy profile function to generate the control signals for transmission power and transmission rate to the transmitter circuit to reduce energy consumption per data element during transmission, wherein the energy management unit minimizes energy consumption as a function of transmission power and transmission rate as adjusted for error rate.

11. The digital radio transmitter of claim 10 wherein the energy management unit minimizes energy consumption according to an equation:

$$\frac{E(p_i, r_j)}{1-q}$$

where $E(p_i, r_j)$ is the energy consumption as a function of transmission power $p_i$ and transmission rate $r_j$ per the energy profile function and q is the error rate.

12. A method of wireless transmission of digital data by a first wireless device comprising the steps of:
   (a) receiving for transmission digital data having data elements at a transmitter circuit receiving control signals controlling transmission power and transmission rate of the transmission;
   (b) reading an electronic memory storing data providing an energy profile function relating a plurality of transmission power and transmission rate values to energy consumption values of the digital radio transmitter, the energy consumption values of the energy profile capturing energy inefficiencies of actual hardware of the wireless device, the energy profile providing at least one of:
   (i) a relationship reflecting energy use per bit as a function of transmission rate where energy use per bit decreases less than in inverse proportion to increase in transmission rate; and
   (ii) a relationship reflecting energy use per bit as a function of transmission power where energy use per bit increases less than in proportion to increase in transmission power; and
   (c) generating control signals for transmission power and transmission rate to the transmitter circuit according to the energy profile function to reduce energy consumption per data element during transmission
   further detecting an error rate in the transmission by the digital radio transmitter and reading the energy profile function to dynamically generate the control signals for transmission power and transmission rate to the transmitter circuit to reduce energy consumption per data element during transmission in response to changing error rate.

13. The method of claim 12 wherein the control signals are changed to reduce a total energy consumption of a data transmission comprised of the sum of originally transmitted digital data and retransmission of at least a portion of the originally transmitted digital data required because of transmission errors indicated by the error rate.

14. The method of claim 13 wherein the control signals are changed to minimize energy consumption according to an equation:

$$\frac{E(p_i, r_j)}{1-q}$$

where $E(p_i, r_j)$ is the energy consumption as a function of transmission power $p_i$ and transmission rate $r_j$ per the energy profile function and q is the error rate.

15. The method of claim 12 further including the step of selectively compressing the digital data to reduce energy consumption.

16. The method of claim 15 wherein the compressing selects between full header information and reduced header information to reduce energy consumption.

17. The method of claim 16 wherein the transmission is to a second wireless device that is substantially unconstrained by energy usage and that provides a proxy for a network protocol used in transmission that holds network protocol state information for the first wireless device reducing the transmissions required by the first wireless device using the proxy when compared to transmission by the first wireless device directly implementing the network protocol.

18. The method of claim 17 wherein network protocol is a TCP/IP network protocol and wherein the IP and TCP headers are removed when transmitting from the first wireless device to the second wireless device.

19. The method of claim 18 wherein the first wireless device communicates with the second wireless device by remote procedure calls at an application level.

20. A method of wireless transmission of digital data by a first wireless device comprising the steps of:
   (a) receiving for transmission digital data having data elements at a transmitter circuit receiving control signals controlling transmission power and transmission rate of the transmission;
   (b) reading an electronic memory storing data providing an energy profile function relating a plurality of transmission power and transmission rate values to energy consumption values of the digital radio transmitter; and
   (c) generating control signals for transmission power and transmission rate to the transmitter circuit according to the energy profile function to reduce energy consumption per data element during transmission;
   further including the steps of:
   detecting error rate in the transmission by the digital radio transmitter; and
   changing the control signals in response to changing error rate;
   wherein the control signals are changed to reduce a total energy consumption of a data transmission comprised of the sum of originally transmitted digital data and retransmission of at least a portion of the originally transmitted digital data required because of transmission errors indicated by the error rate;
   wherein the control signals are changed to minimize energy consumption according to an equation:

$$\frac{E(p_i, r_j)}{1-q}$$

where $E(p_i, r_j)$ is the energy consumption as a function of transmission power $p_i$ and transmission rate $r_j$ per the energy profile function and q is the error rate.

* * * * *